(12) United States Patent
Bolle

(10) Patent No.: US 6,926,850 B2
(45) Date of Patent: Aug. 9, 2005

(54) METHOD FOR MAKING MICRO LENSES

(75) Inventor: Cristian A Bolle, Bridgewater, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 496 days.

(21) Appl. No.: 09/916,011

(22) Filed: Jul. 26, 2001

(65) Prior Publication Data

US 2003/0020188 A1 Jan. 30, 2003

(51) Int. Cl.⁷ .............................................. B29D 11/00
(52) U.S. Cl. ...................................... 264/1.7; 427/162
(58) Field of Search .................. 264/1.7; 427/162; 216/26

(56) References Cited

U.S. PATENT DOCUMENTS

| | | | |
|---|---|---|---|
| 4,689,291 A | | 8/1987 | Popovic et al. ............. 430/321 |
| 5,286,338 A | * | 2/1994 | Feldblum et al. ............ 216/26 |
| 5,479,049 A | * | 12/1995 | Aoki et al. ................. 257/642 |
| 5,498,444 A | * | 3/1996 | Hayes ......................... 427/162 |
| 5,536,455 A | * | 7/1996 | Aoyama et al. ............. 264/1.7 |
| 2002/0094419 A1 | * | 7/2002 | Lin et al. ..................... 428/195 |

OTHER PUBLICATIONS

Lars Erdmann et al., "Technique for monolithic fabrication of silicon microlenses with selectable rim angles", *Opt. Eng.*, vol. 36, No. 4, Apr. 1997, pp. 1094–1098.

* cited by examiner

Primary Examiner—Laura Edwards
(74) Attorney, Agent, or Firm—Eugene J. Rosenthal

(57) ABSTRACT

A micro lens, or an array of micro lenses, can be formed without requiring the etching of a mesa into the substrate by deposited directly on the substrate, without any mesa each of the individual portions of the substance to be melted. The whole substrate and the portions are then conformally coated with a very thin layer of a substance, typically an adhesion promoter, e.g., hexamethyldisilazane (HMDS). The entire coated wafer is then subject to conditions which cause each of the individual substance portions to flow into a lens shape. A lens shape is achieved without requiring a mesa because the layer of adhesion promoter prevents the flowing substance from spilling in an undesired manner over the surface of the substrate.

14 Claims, 1 Drawing Sheet

METHOD FOR MAKING MICRO LENSES

TECHNICAL FIELD

This invention relates to the art of making micro lenses, and more particularly, to making micro lens arrays.

BACKGROUND OF THE INVENTION

Micro lens arrays are used to collimate or focus light. For example, light from a broad source could be focused onto a detector, or beams of light supplied from various optical fibers can each be collimated by a respective one of the micro lenses.

Micro lens arrays are often made by flowing, e.g., softening and/or melting, each of an array of individual portions of a substance into respective drop shapes to obtain an array of spherical micro lenses. The substance employed is typically one of the various conventional photoresists. Alternatively, the shape of the drop may be transferred to the substrate which is hosting the drops by etching at the same time both the substrate and the drops till of the substance has been etched. Doing so eliminates the drops and leaves the substrate with an array of drop shapes each of which acts as a micro lens. Such techniques are set forth in more detail in "Techniques for monolithic fabrication of silicon micro lenses with selectable rim angles", by Lars Erdmann, and Dirk Efferenn, published in Optical Engineering, volume 36, No. 4, pp. 1094–1098, April 1997 and U.S. Pat. No. 4,689,291, issued to Popovic et al. on Aug. 25, 1987, which are incorporated by reference as if fully set forth herein.

In order to prevent the substance from flowing freely on the surface of the substrate, and to determine the ultimate diameter of the base of the micro lens, a common practice is to etch a mesa into the substrate prior to depositing thereon the substance to be melted. Disadvantageously, having to etch such a mesa for each micro lens complicates the method because the steps to etch the mesa are not trivial, accounting for approximately half of the total steps of the micro-lens-array-making process.

SUMMARY OF THE INVENTION

I have recognized that, in accordance with the principles of the invention, a micro lens, or an array of micro lenses, can be formed without requiring the etching of a mesa into the substrate as required by the prior art. More specifically, each of the individual portions of the substance to be flowed is deposited directly on the substrate, without any mesa having been etched therein for micro lens positioning purposes, and then the whole substrate and the portions of the substance to be flowed are conformally coated with a coating substance. The conformally coating layer may be a very thin layer, e.g., with respect to the thickness of the portions of the substance to be flowed, and is typically a layer of an adhesion promoter, e.g., hexamethyldisilazane (HMDS). The entire coated wafer is then subject to conditions, such as exposure to solvent vapors and/or heat, which cause each of the individual portions of the substance to be flowed to flow into a lens shape. A lens shape is achieved, without the prior-art-required mesa, because the coating prevents each of the portions of the substance to be flowed from spilling in an undesired manner over the surface of the substrate.

Advantageously, the entire prior art process of forming a mesa, and all of its incident steps, are not required, thus greatly simplifying and speeding the process of forming each micro lens. Additionally, each resulting micro lens does not have any visible mesa after its manufacture. Further advantageously, the shape of the base of each micro lens is defined by the initial shape of the portion of the substance to be flowed as it was deposited prior to being flowed, thus allowing various shaped micro lenses to be easily fabricated. If each portion of the substance to be flowed as formed into a micro lens shape after flowing is sufficient to meet the desired requirements of the lens, the process may be stopped at this point. Alternatively, one or more of the portions of the substance to be flowed and substrate may be etched at the same time until the micro lens shape is transferred to the substrate.

After the micro lens is formed, further processing may be performed. For example, if the micro lens is formed from positive photoresist that is unexposed, a portion of the photoresist may be exposed and developed, which removes a portion of the micro lens.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views embodying the principles of the invention.

In the claims hereof any element expressed as a means for performing a specified function is intended to encompass any way of performing that function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

In the description, identically numbered components within different ones of the FIGS. refer to the same components.

Figure 1:
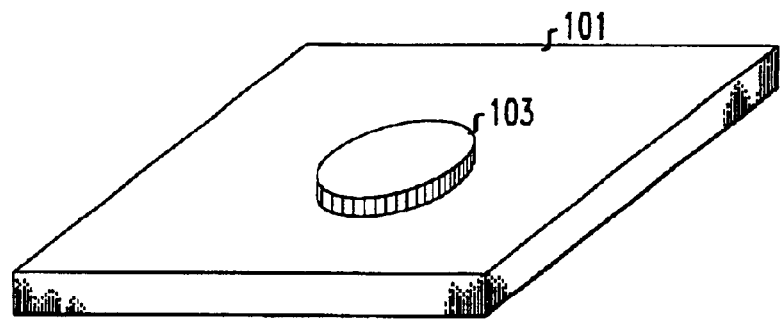
FIG. 1 shows a substrate on which is deposited a substance to be flowed.

FIG. 1 shows substrate 101, i.e., a wafer, e.g., a silicon, glass, gallium-aresenide, quartz, or the like, properly cleaned and preconditioned as those of ordinary skill in the art will readily recognize may be necessary, on which is deposited, using conventional techniques, substance to be flowed 103. Substance to be flowed 103 may be any substance that can be made to flow. If the substance to be flowed is going to be left on the substrate as the micro lens, rather than merely using the substance to be flowed as a template for use in etching the micro lens into the substrate, then the substance to be flowed must be adequate as a micro lens at the light frequency of interest. One material which has been employed as the substance to be flowed is photoresist, e.g., positive resist or negative resist. Although substance to be flowed 103 is shown having a circular shape, any shape desired by the implementer may be employed. Furthermore, the shape may be such that it contains empty space within, e.g., doughnut shaped.

If photoresist is employed as the substance to be flowed, then conventional photolithography techniques may be used to define the various areas at which the substance to be flowed is deposited and to deposit the material as well. Optionally, it may be necessary to clean or otherwise condition the exposed surface of substrate 101 after deposition of substance to be flowed 103 from any residue of the deposition process.

Figure 2:
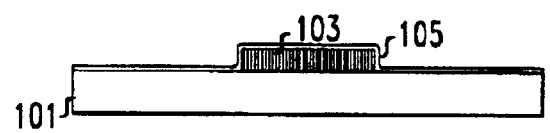
FIG. 2 shows a cross section of the substrate of FIG. 1 after deposit of the substance to be flowed and a conformal coating, in accordance with the principles of the invention.

FIG. 2 shows a cross section of substrate 101 after deposit of substance to be flowed 103 and conformal coating 105, in accordance with the principles of the invention. Conformal coating 105 is preferably much thinner than the thickness of the substance to be flowed, e.g., it may be a so-called "mono layer", and it coats at least the deposit of substance to be flowed 103 and the surrounding substrate area. One material that has been used as conformal coating 105 is hexamethyldisilazane (HMDS). The conformal coating material may be deposited using any conventional technique, e.g., vapor deposition or spin deposition.

Figure 3:
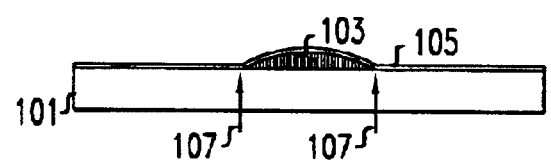
FIG. 3 shows the cross section of the substrate of FIG. 2 after flowing of the substance to be flowed and the resulting "pinning" of the edges of the substance to be flowed in accordance with the principles of the invention; and A substrate that was subject to various processing after the micro lens shape was initially formed so as processed to produce various shaped micro lenses is shown in FIG. 4.

FIG. 3 shows the cross section of substrate 101 of FIG. 2 after flowing of substance to be flowed 103. The flowing of substance to be flowed 103 is achieved by subjecting the entire coated wafer to conditions, such as exposure to solvent vapors and/or heat, which causes substance to be flowed 103 to flow into a lens shape. Advantageously, the lens shape is achieved without requiring the formation of a mesa, which was required by prior art micro lens forming techniques. This is because the conformal coating "pins" the edges of the material to be flowed, e.g., at points 107, thus preventing it from flowing beyond its original footprint on the substrate. As will be readily appreciated by those of ordinary skill in the art, the particular conditions required are a function of the particular materials employed.

Figure 4:

After the micro lens is formed, further processing may be performed. For example, if the micro lens is formed from positive photoresist that is unexposed, a portion of the photoresist may be exposed and developed, which removes a portion of the micro lens. A substrate that was so processed to produce various shaped micro lenses is shown in FIG. 4. Although FIGS. 1–3 show only the formation of a single micro lens, that is for pedagogical and clarity purposes only. Clearly, as will be appreciated by those of ordinary skill in the art, and as can be seen from FIG. 4, the principles of the invention may advantageously be employed to form arrays of micro lenses.

After the desired lens shape, e.g., as shown in FIG. 3 or FIG. 4, is achieved, the resulting structure may be hard baked to make the micro lens harder. Furthermore, the lens shape may further be transferred to the substrate by etching both the micro lens and the substrate at substantially the same rate and at the same time.

Advantageously, the resulting micro lens does not have any visible mesa after its manufacture. By visible it is meant for purposes of this application that the mesa cannot be seen even through the use of an electron microscope.

What is claimed is:

1. A method for making at least one micro lens comprising the steps of:

depositing at least one individual portion of a substance to be flowed on a substrate;

coating with an adhesion promoter said at least one individual portion of said substance to be flowed and at least the immediate surroundings on said substrate of said at least one individual portion;

exposing said coated substrate and said coated at least one individual portion of said substance to be flowed to conditions which cause said substance to be flowed to flow;

whereby said at least one individual portion of said substance to be flowed is formed into a micro lens shape without requiring formation of a mesa for said at least one individual portion of substance to be flowed.

2. The invention as defined in claim 1 further comprising the step of etching said combined substrate and said at least one individual portion of substance to be flowed slier said micro lens shape is formed so that said substrate and said at least one individual portion of substance to be flowed are etched at substantially the same rate.

3. The invention as defined in claim 1 wherein further comprising the step of hard baking said combined substrate and said at least one individual portion of substance to be flowed after said micro lens shape is formed.

4. The invention as defined in claim 1 wherein said adhesion promoter is hexamethyldislazane (HMDS).

5. The invention as defined in claim 1 wherein said coating is a mono layer of said adhesion promoter.

6. The invention as defined in claim 1 wherein said substance to be flowed is a photo resist.

7. The invention as defined in claim 1 wherein, in said coating step, substantially the entire surface of said substrate on which said at least one individual portion of substance to be flowed is deposited is coated by said adhesion promoter.

8. The invention as defined in claim 1 wherein, in said coating step, said adhesion promoter conformally coals said at least one individual portion of said substance to be flowed and said at least immediate surrounding on said substrate.

9. The invention as defined in claim 1 wherein said conditions which cause said substance to be flowed to flow is created at least by heating said substance to be flowed and said substrate.

10. The invention as defined in claim 1 wherein said conditions which cause said substance to be flowed to flow is created at least by exposing said substance to be flowed and said substrate to solvent vapors.

11. The invention as defined in claim 1 further comprising the step of cleaning said substrate from any residue which would prevent adhesion of said adhesion promoter prior to said coating step and after said depositing step.

12. The invention as defined in claim 1 further comprising the step of preconditioning said substrate prior to said coating step and after said depositing step.

13. The invention as defined in claim 1 wherein said at least one individual portion of a substance to be flowed is at least two portions arranged as an array.

14. The invention as defined in claim 1 further comprising the step of etching substantially only said at least one individual portion of substance to be flowed.

* * * * *